(12) United States Patent
DuPont et al.

(10) Patent No.: US 12,285,740 B1
(45) Date of Patent: Apr. 29, 2025

(54) DIRECT LITHIUM EXTRACTION COMPOSITIONS AND METHODS

(71) Applicant: Albemarle Corporation, Charlotte, NC (US)

(72) Inventors: Jesse DuPont, Zachary, LA (US); Keyur Shah, Waxhaw, NC (US); Sumitra Karki, Zachary, LA (US); Charles Wesley Hamilton, Marvin, NC (US)

(73) Assignee: ALBEMARLE CORPORATION, Charlotte, NC (US)

( * ) Notice: Subject to any disclaimer, the term of this patent is extended or adjusted under 35 U.S.C. 154(b) by 0 days.

(21) Appl. No.: 18/752,302

(22) Filed: Jun. 24, 2024

(51) Int. Cl.
*B01J 20/28* (2006.01)
*B01J 20/02* (2006.01)
*B01J 20/30* (2006.01)
*C22B 26/12* (2006.01)

(52) U.S. Cl.
CPC ....... *B01J 20/2803* (2013.01); *B01J 20/0248* (2013.01); *B01J 20/28004* (2013.01); *B01J 20/28026* (2013.01); *B01J 20/28059* (2013.01); *B01J 20/28061* (2013.01); *B01J 20/28085* (2013.01); *B01J 20/3007* (2013.01); *B01J 20/3021* (2013.01); *B01J 20/3078* (2013.01); *C22B 26/12* (2013.01)

(58) Field of Classification Search
CPC .... B01J 20/28; B01J 20/2803; B01J 20/0248; B01J 20/28004; B01J 20/28026; B01J 20/28059; B01J 20/28061; B01J 20/28085; B01J 20/3007; B01J 20/3021; B01J 20/3078; C22B 26/12
USPC .......................................................... 502/415
See application file for complete search history.

(56) References Cited

U.S. PATENT DOCUMENTS

| | | | |
|---|---|---|---|
| 10,648,061 B2 | 5/2020 | Cheng | |
| 10,786,802 B2 | 9/2020 | Boualleg et al. | |
| 11,554,958 B2 | 1/2023 | Sridharan et al. | |

FOREIGN PATENT DOCUMENTS

| | | | | |
|---|---|---|---|---|
| CN | 102631897 | | 8/2012 | |
| CN | 107250049 B | * | 6/2019 | ............ B01J 20/041 |
| CN | 111215040 | | 6/2020 | |
| CN | 109415219 B | * | 10/2021 | ........... B01D 15/206 |

* cited by examiner

*Primary Examiner* — Edward M Johnson
(74) *Attorney, Agent, or Firm* — KDW Firm PLLC

(57) ABSTRACT

Sorbent compositions for direct lithium extraction (DLE). The sorbent compositions include a lithiated aluminum component and an inorganic binder, and are in the form of shaped particles. The lithiated aluminum component makes up about 50% w/w to about 90% w/w of the sorbent compositions, whereas the binder makes up about 10% w/w to about 50% w/w of the sorbent compositions. Processes for producing the sorbent compositions are also provided, as are methods of using the sorbent compositions for DLE.

15 Claims, 5 Drawing Sheets

DIRECT LITHIUM EXTRACTION COMPOSITIONS AND METHODS

TECHNICAL FIELD

The presently disclosed subject matter is directed to direct lithium extraction sorbent compositions and methods. More specifically, the presently disclosed subject matter is directed to new economical and practical compositions and methods for recovering lithium values by selective adsorption from lithium-containing brines to obtain lithium salts of high purity and in high yields.

BACKGROUND

In recent years a significant need has arisen for more economical and efficient technology enabling production of high purity lithium or its salts from suitable sources. This is reflected in the increased demand for lithium and an increase in research activities devoted to this subject. And it appears that this need has not yet been fulfilled.

The extraction of lithium from brines using solid sorbents, solvents, or other methods except for traditional evaporative methods is often termed direct lithium extraction. In one type of direct lithium extraction, a lithium bearing brine source is subjected to a sorbent. However, existing sorbents suffer from a number of shortcomings including, among others, minimally available surface area, instability in high temperatures, high cost, and insufficient lithium loading capacity.

What is needed are improved direct lithium extraction sorbent compositions and methods that are more efficient and more effective at extracting lithium.

BRIEF SUMMARY

This summary lists several embodiments of the presently disclosed subject matter, and in many cases lists variations and permutations of these embodiments. This summary is merely exemplary of the numerous and varied embodiments. The mention of one or more representative features of a given embodiment is likewise exemplary. Such an embodiment can typically exist with or without the feature(s) mentioned; likewise, those features can be applied to other embodiments of the presently disclosed subject matter, whether listed in this summary or not. To avoid excessive repetition, this Summary does not list or suggest all possible combinations of such features.

In one aspect, provided is a sorbent composition for direct lithium extraction (DLE), the sorbent comprising a lithiated aluminum component, the lithiated aluminum component selected from the group consisting of a lithiated aluminum trihydroxide (ATH), lithiated aluminum oxide and/or lithiated boehmite, and an inorganic binder, wherein the lithiated aluminum component makes up about 50% w/w to about 90% w/w of the sorbent composition, wherein the inorganic binder makes up about 10% w/w to about 50% w/w of the sorbent composition, wherein the sorbent composition is in the form of shaped particles. In some embodiments, the lithiated aluminum component comprises lithiated ATH (Li-DATH). In some embodiments, the inorganic binder comprises a boehmite-based binder, a boehmite/silica-based binder, a colloidal silica binder, a waterglass binder, an aluminum phosphate binder, an aluminum halide-based binder and/or a combination thereof.

In some embodiments, the shaped particles have a particle size ranging from about 100 to about 4000 micron, optionally about 200 to about 1500 micron, optionally about 20 to about 100 micron or greater. In some embodiments, the shaped particles have a diameter of about 0.5 mm to about 4.0 mm, optionally about 0.65 mm to about 1.75 mm, and a length to diameter ratio of about 0.25:1 to 5:1, optionally about 0.5:1 to 3.5:1.

In some embodiments, the sorbent composition comprises shaped particles having a Brunauer-Emmett-Teller (BET) surface area ranging from about 4 m2/g to about 105 m2/g, optionally about 4 m2/g to about 25 m2/g, optionally about 20 m2/g to about 45 m2/g, optionally about 45 m2/g to about 90 m2/g, optionally about 10 m2/g to about 105 m2/g, optionally about 50 m2/g to about 90 m2/g, optionally about 70 m2/g to about 105 m2/g. In some embodiments, the sorbent composition comprises shaped particles having an average pore diameter of about 170 nm to about 230 nm, optionally about 100 nm to about 170 nm, optionally about 80 nm to about 115 nm. In some embodiments, the shaped particles are spheronized, optionally wherein the spheronized shaped particles are subsequently dried at about 120° C. or higher, optionally dried for at least about 30 minutes or more.

In some embodiments, the sorbent composition is heat treated, optionally wherein the heat treatment comprises heating at about 120-450, optionally 120° C., 150° C., 180° C., 200° C., 250° C., 300° C., 350° C., 400° C. and/or 450° C. In some embodiments, the sorbent composition is heat treated, optionally wherein the heat treatment comprises heating for up to about 1 hour or greater, optionally about 15 minutes to about 30 minutes, optionally greater than about 2 hours.

In some embodiments, the shaped particles comprise dumbbell shaped particles, cylindrical shaped particles, spherical shaped particles, bilobe shaped particles, trilobe shaped particles, quadrilobed shaped particles and/or combinations thereof. In some embodiments, the shaped particles are shaped via extrusion, pelletizing, granulation, compaction, compaction/granulation, and/or pressing.

In some embodiments, the binder comprises sodium silicate, optionally wherein the sodium silicate is at a concentration of about 10% w/w to about 50% w/w, preferably at a concentration of about 15% w/w to about 35% w/w, and more preferably at a concentration of about 23-27%.

In some embodiments, the sorbent composition has a lithium adsorption capacity of about 3.0 mg/g (mg Li per g of sorbent) to about 7.5 mg/g, optionally about 4.5 mg/g to about 7.5 mg/g, and preferably about 5.5 mg/g to about 7.5 mg/g.

In some aspects, provided herein is a process for producing a sorbent composition, the process comprising: activating an aluminum component using an activation solution, wherein the activation solution comprises a solution of one or more of a lithium salt and/or alkaline material such as sodium hydroxide, potassium hydroxide, ammonium hydroxide, wherein the activated aluminum component comprises a lithiated aluminum component; combining the lithiated aluminum component with one or more binders selected from the group consisting of a boehmite-based binder, a boehmite/silica based binder, a colloidal silica binder, an alumina binder, a hydrated alumina binder, a waterglass binder, an aluminum phosphate binder, an aluminum halide based binder and/or a combination thereof; and shaping the sorbent to form shaped particles of the sorbent composition.

In some embodiments, the process further comprises peptizing the peptizable boehmite or alumina or other alumina-hydrate-based binder and/or the peptizable boehmite or alumina or other alumina-hydrate/silica-based binder with nitric acid. Optionally acids such as hydrochloric acid, formic acid, acetic acid, propionic acid, 2-bromopropanoic acid or other organic acids, hydrobromic acid, hydrofluoric acid, sulfuric acid, phosphoric acid, chromic acid, or others or precursors capable of generating the above, for example but not limited to the use of benzyl bromide to generate a hydrogen bromide or hydrobromic acid in situ. Anhydrous hydrogen halides or hydrogen pseudohalides may similarly be used. In some embodiments, activating the aluminum component using the activation solution comprises mixing the activation solution with the aluminum component at a ratio of about 0.5:2 to about 1.2:1 moles of lithium to moles of aluminum. In some embodiments, the aluminum component comprises ATH, optionally wherein the aluminum component comprises one or more of boehmite, pseudo-boehmite, and/or alumina. In some embodiments, the aluminum component is mixed with the activation solution for about 15 minutes or more, optionally about 30 minutes or more, optionally about 1 hour or more, optionally greater than about 2 hours, optionally greater than about 24 hours, optionally greater than about 48 hours. In some embodiments, activating the aluminum component comprises contacting the aluminum component with an aqueous solution of lithium hydroxide and/or one or more lithium salts and one or more alkaline material, optionally wherein the lithium salt is selected from the group consisting of lithium sulfate, lithium bromide, lithium nitrate, lithium hexafluoroaluminate, lithium phosphate, lithium fluoride and combinations thereof, optionally wherein the alkaline material is selected from the group consisting of hydroxides, alkoxides, and/or phosphates of lithium, sodium, potassium, cesium, calcium, and/or ammonium. Additionally, in some aspects the aqueous solution can include combinations of LiCl/KOH, LiCl/NaOH, LiBr/NaOH, LiBr/KOH, LiNO3/NaOH, LiNO3/KOH, LiNO3/Ca(OH)2, LiCl/Ca(OH)2, LiCl/NH4OH, LiCl/K3PO4, LiCl/K2HPO4, LiCl/Na3PO4, LiCl/Na2HPO4, LiBr/NH4OH, LiBr/Na3PO4, LiBr/Na2HPO4, Li2SO4/NaOH, Li2SO4/KOH, Li2SO4/NH4OH, Li2SO4/Na3PO4, Li2SO4/Na2HPO4, LiCl/LiOH, LiNO3/LiOH, and/or LiF/NaOH.

In some embodiments, activating the aluminum component comprises contacting the aluminum component with an aqueous solution of lithium chloride and sodium hydroxide to form a sorbent of the formula (LiX)n(LiY)1-n·2Al(OH)3, where n=0 to 1, followed by reaction with an aqueous solution of an acid to convert LiOH in the sorbent to LiX, optionally wherein the acid comprises HCl, HNO3, HBr, H2SO4, formic acid, acetic acid, propionic acid, 2-bromopropionic acid, AlCl3, and/or combinations thereof.

In some embodiments, the process further comprises neutralizing the activated aluminum component. In some embodiments, neutralizing the activated aluminum component comprises the addition of acid to the activation solution until the pH reaches between about 5 to about 7. In some embodiments, neutralizing the activated aluminum component comprises the use of washing and/or ion exchange to remove caustic material.

In some embodiments, the sorbent composition is heat treated, optionally wherein the heat treatment comprises heating at about 120-450, optionally 120° C., 150° C., 180° C., 200° C., 250° C., 300° C., 350° C., 400° C. and/or 450° C. In some embodiments, the sorbent composition is heat treated, optionally wherein the heat treatment comprises heating for up to about 1 hour or greater, optionally about 15 minutes to about 30 minutes, optionally greater than about 2 hours.

In some embodiments, the process further comprises filtering the solution to produce a residue of lithiated-sorbent, and optionally drying the residue, prior to shaping the residue of sorbent to form the sorbent composition in a shaped form.

In some embodiments, the process further comprises milling the dried residue of sorbent, optionally milling the dried residue of sorbent to a fine powder with a d50 of less than about 50 microns, preferably less than about 35 microns, and more preferably less than about 25 microns. In some embodiments, shaping the sorbent to form the sorbent composition in a shaped form comprises mixing the dried residue of sorbent with one or more liquids, e.g. water or any suitable liquid, to form a paste followed by extrusion, pelletizing, granulation, compaction, and/or pressing. In some embodiments, shaping the sorbent to form the sorbent composition in a shaped form comprises forming the shaped sorbent composition from the dried residue using extrusion, pelletizing, granulation, compaction, and/or pressing, optionally wherein the binder is provided as a liquid, optionally wherein the one or more liquids contains the binder.

In some embodiments, the process further comprises spheronizing the shaped sorbent to form dumbbell shaped particles, cylindrical shaped particles, spherical shaped particles, bilobe shaped particles, trilobe shaped particles, quadrilobed shaped particles and/or combinations thereof.

In some embodiments, the process further comprises adding one or more rheology modifiers prior to shaping. In some embodiments, the rheology modifier is a modified cellulose, preferably methylcellulose. In some embodiments, the rheology modifier is a clay, preferably bentonite clay. In some embodiments, the rheology modifier is added as about 0.1% to about 5% of the total weight of the formulation dry weight, preferably about 0.2% to about 3%, more preferably about 0.3% to about 1.5%.

Also provided herein are processes for producing an aqueous lithium-containing solution from a source of dissolved lithium in solution, which process comprises: a lithium adsorption step comprising passing the source of dissolved lithium in solution into and out of a bed of sorbent composition as disclosed herein to thereby extract at least a portion of lithium from the source of dissolved lithium into the sorbent composition; and a desorption step comprising washing the bed of sorbent composition with an aqueous solution, optionally a dilute solution of lithium chloride, to obtain a lithium eluent solution. The above and other embodiments, objectives, features, and advantages of this invention will become still further apparent from the ensuing description, appended claims, and accompanying drawings.

BRIEF DESCRIPTION OF THE DRAWINGS

The presently disclosed subject matter can be better understood by referring to the following example figure. The components in the figure are not necessarily to scale, emphasis instead being placed upon illustrating the principles of the presently disclosed subject matter (often schematically). In the figure, like reference numerals designate corresponding parts throughout the different views. A further understanding of the presently disclosed subject matter can be obtained by reference to an embodiment set forth in the illustrations of the accompanying drawing. Although the illustrated embodiment is merely for purposes of example of systems for carrying out the presently disclosed subject matter, both the organization and method of operation of the presently disclosed subject matter, in general, together with further objectives and advantages thereof, may be more easily understood by reference to the drawings and the following description. The drawing is not intended to limit the scope of this presently disclosed subject matter, which is set forth with particularity in the claims as appended or as subsequently amended, but merely to clarify and provide examples of the presently disclosed subject matter.

DETAILED DESCRIPTION

I. Definitions

Figure 1:
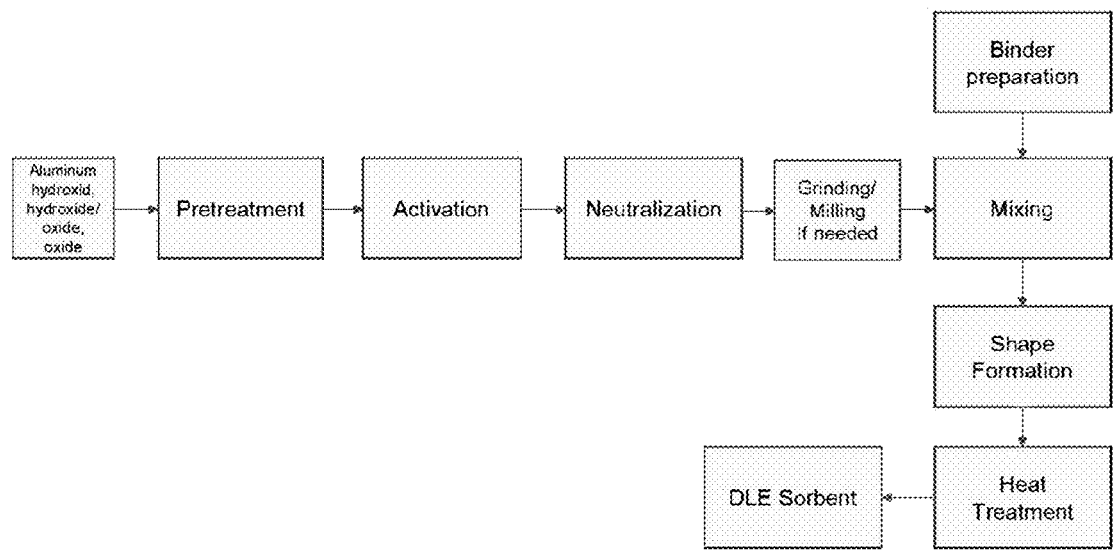
FIG. 1 is a flow diagram of a process for making a sorbent composition as disclosed herein.

The terminology used herein is for the purpose of describing particular embodiments only and is not intended to be limiting of the presently disclosed subject matter.

While the following terms are believed to be well understood by one of ordinary skill in the art, the following definitions are set forth to facilitate explanation of the presently disclosed subject matter.

All technical and scientific terms used herein, unless otherwise defined below, are intended to have the same meaning as commonly understood by one of ordinary skill in the art. References to techniques employed herein are intended to refer to the techniques as commonly understood in the art, including variations on those techniques or substitutions of equivalent techniques that would be apparent to one of skill in the art. While the following terms are believed to be well understood by one of ordinary skill in the art, the following definitions are set forth to facilitate explanation of the presently disclosed subject matter.

Components referred to by chemical name or formula anywhere in the specification or claims hereof, whether referred to in the singular or plural, are identified as they exist prior to coming into contact with another substance referred to by chemical name or chemical type (e.g., another component, a solvent, or etc.). It matters not what chemical changes, transformations and/or reactions, if any, take place in the resulting mixture or solution as such changes, transformations, and/or reactions are the natural result of bringing the specified components together under the conditions called for pursuant to this disclosure. Thus, the components are identified as ingredients to be brought together in connection with performing a desired operation or in forming a desired composition. Also, even though the claims hereinafter may refer to substances, components and/or ingredients in the present tense ("comprises", "is", etc.), the reference is to the substance, component or ingredient as it existed at the time just before it was first contacted, blended or mixed with one or more other substances, components and/or ingredients in accordance with the present disclosure. The fact that a substance, component or ingredient may have lost its original identity through a chemical reaction or transformation during the course of contacting, blending or mixing operations, if conducted in accordance with this disclosure and with ordinary skill of a chemist, is thus of no practical concern.

In describing the presently disclosed subject matter, it will be understood that a number of techniques and steps are disclosed. Each of these has individual benefit and each can also be used in conjunction with one or more, or in some cases all, of the other disclosed techniques.

Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Following long-standing patent law convention, the terms "a", "an", and "the" refer to "one or more" when used in this application, including the claims. Thus, for example, reference to "a cell" includes a plurality of such cells, and so forth.

Unless otherwise indicated, all numbers expressing quantities of ingredients, reaction conditions, and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

As used herein, the term "about," when referring to a value or to an amount of a composition, dose, mass, weight, temperature, time, volume, concentration, percentage, etc., is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

The term "comprising", which is synonymous with "including" "containing" or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

As used herein, the term "concentrated" when used in connection with a solution or in connection with a brine is meant to include a solution or brine that is saturated.

As used herein, an "alumina component" comprises any suitable alumina or aluminum composition or material. By way of example and not limitation, such alumina components include alumina, hydrated alumina or aluminum hydroxide, boehmite, and pseudoboehmite.

More particularly, one of the substances used in the practice of this invention is "hydrated alumina" which is also known in the art by a variety of terms such as alumina hydrate, alumina trihydrate, or aluminum hydroxide. It is also often identified by use of the acronym "ATH". Typically, these materials are assigned the formula $Al(OH)_3$ or $Al_2O_3 \cdot 3H_2O$. Thus, these and any other named substance of the same chemical character as any of these named materials such as Gibbsite and Bayerite are deemed suitable for use in the process of this invention. If there is any difference among such materials, one should of course use the one that gives the best performance at the lowest cost.

II. Overview of Direct Lithium Extraction Compositions and Methods

The extraction of lithium from brines using solid sorbents, solvents, or other methods except for traditional evaporative methods is often termed direct lithium extraction (DLE). In one concept of direct lithium extraction, a lithium bearing brine source is subjected to a solid phase sorbent capable of selectively adsorbing lithium. The loaded sorbent is then unloaded through a process containing any of: brine displacement, draining, washing, and selective removal of lithium into either a water or other weak salt solution. Existing sorbents, including commercially available sorbents, suffer from a number of shortcomings including, minimal available surface area, instability in high temperatures, high cost, and insufficient lithium loading capacity among others. These sorbents may be a mixture of a lithium specific binding agent dispersed withing a polymer matrix or a binding agent or similar within an inorganic bound shaped material (U.S. Pat. No. 10,786,802). The organic bound materials suffer from matrix incompatibilities and are available only through sole commercial agreements or are costly. The inorganic materials seem viable but are not commercially available and are not made in the most economical sense due to the use of boehmite and have limitations in adsorption capacity, specific surface areas, temperature limits, and strength among other.

Previously, compacted grades of ATH were shown to provide significant benefit but also require rather long neutralization periods. As a significant improvement, and as disclosed herein, appropriate grades of ATH or other aluminum compounds as are known in the art can be activated and optionally neutralized to form Li X-(DATH) prior to placement in a column or subjected further to processing, shaping and heat treatment. A premium commercial lithium sorbent should display several characteristics known to those in the art, however in relation to this invention, some important characteristics are:

- ability to ex situ manufacture and store prior to placement in a factory
- suitable compressive strength to allow for increased packed bed height
- high lithium sorption capacity, often expressed as g Li/kg sorbent or g Li/L sorbent in the case of less dense materials
- feasible kinetic and thermodynamic binding properties for rapid and complete uptake of lithium under a variety of conditions
- stability in strong and weak brines at numerous pH systems in the presence of oxidizers or other harsh conditions.

As discussed in more detail herein, the presently disclosed subject matter is in some aspects directed to the selection of an aluminum hydroxide or other aluminum compounds as are known in the art of sufficient particle size and surface area, subjecting said aluminum compound to an activation step wherein lithium cations are selectively inserted into the aluminum matrix, where the anions are one or more of chloride, nitrate, bromide, sulfate, trifluoromethanesulfonate, sulfide, hydrosulfide, fluoride, hypobromite or hypochlorite, 2-bromopropionate, carbonate or hydroxide. In selection of the aluminum hydroxide or other aluminum compounds as are known in the art or preparation of the aluminum hydroxide or other aluminum compounds as are known in the art, care must be taken to balance particle size, surface area, and contaminant profiles with ease of processibility and cost. The source of the lithium also should balance the cost of the material with the impact to the newly formed lithium intercalation site and subsequent applications. As such, chlorides and fluorides may be preferred, however lithium salts such as lithium hydroxide, lithium sulfate or lithium nitrate or others may be used where they provide preferential properties and cost is determined to be economical.

Generally, the presently disclosed subject matter includes some or all the following steps: 1. Selection, procurement, production or other means to gain an aluminum hydroxide or compound or compounds capable of generating aluminum hydroxide or other aluminum compounds as are known in the art 2. Subjecting said aluminum compound to a conversion step wherein the final or an intermediate product is a lithium containing aluminum hydroxide, oxide, or oxide-hydroxide compound otherwise known as a lithiated aluminum component; for alkaline products or products with unsuitable counterions for subsequent steps, the conversion may also include neutralization, ion exchange, or washing. 3. Subsequent processing to provide for a lithiated aluminum component capable of selectively adsorbing lithium 4. Further additions of materials such as inorganic or organic binders. 5. Shaping of the produced material, either through extrusion, compaction, immobilization in a suitable solid material, or other techniques as are known to those skilled in the art. 6. Subjecting the solid to one or more thermal treatment(s) at >70 C, preferably greater than 120, and most preferably 180-320 C, optionally 180-320 C or greater. 7. Hydrothermal treatment of the material may occur as a function of the thermal treatment as described in 6, or, alternatively, the hydrothermal treatment can: a) occur as part of thermal treatment described in 6.; b) occur prior to the thermal treatment described in 6.; occur after the thermal treatment described in 6.; or a combination thereof.

III. Direct Lithium Extraction Sorbent Compositions

In one aspect, provided are sorbent compositions for direct lithium extraction (DLE). Such sorbents can in some aspects include lithiated aluminum components and a binder, including for example but not limited to, an inorganic binder and/or a peptizable binder. By way of example and not limitation, such inorganic binders comprise a peptizable boehmite or alumina or other alumina-hydrate-based binder, a boehmite or alumina or other peptizable alumina-hydrate/silica-based binder, a colloidal silica binder, a waterglass binder, an aluminum phosphate binder, an aluminum halide-based binder and/or a combination thereof. Such peptizable binders can include, for example, alumina, boehmite, or other hydrates of alumina-based binders or alumina, boehmite, or other hydrates of alumina binders in combination with a silica component or silica-based binders.

In some aspects, the lithiated aluminum component can make up about 50% w/w to about 90% w/w of the sorbent composition, optionally about 50% w/w, about 51% w/w, about 52% w/w, about 53% w/w, about 54% w/w, about 55% w/w, about 56% w/w, about 57% w/w, about 58% w/w, about 59% w/w, about 60% w/w, about 61% w/w, about 62% w/w, about 63% w/w, about 64% w/w, about 65% w/w, about 66% w/w, about 67% w/w, about 68% w/w, about 69% w/w, about 70% w/w, about 71% w/w, about 72% w/w, about 73% w/w, about 74% w/w, about 75% w/w, about 76% w/w, about 77% w/w, about 78% w/w, about 79% w/w, about 80% w/w, about 81% w/w, about 82% w/w, about 83% w/w, about 84% w/w, about 85% w/w, about 86% w/w, about 87% w/w, about 88% w/w, about 89% w/w, or about 90% w/w.

In some aspects, the binder makes up about 10% w/w to about 50% w/w of the sorbent composition, optionally about 10% w/w, about 11% w/w, about 12% w/w, about 13% w/w, about 14% w/w, about 15% w/w, about 16% w/w, about 17% w/w, about 18% w/w, about 19% w/w, about 20% w/w, about 21% w/w, about 22% w/w, about 23% w/w, about 24% w/w, about 25% w/w, about 26% w/w, about 27% w/w, about 28% w/w, about 29% w/w, about 30% w/w, about 31% w/w, about 32% w/w, about 33% w/w, about 34% w/w, about 35% w/w, about 36% w/w, about 37% w/w, about 38% w/w, about 39% w/w, about 40% w/w, about 41% w/w, about 42% w/w, about 43% w/w, about 44% w/w, about 45% w/w, about 46% w/w, about 47% w/w, about 48% w/w, about 49% w/w, and about 50% w/w.

In preferred embodiments, the lithiated aluminum component can make up about 50% w/w to about 90% w/w of the sorbent composition, where the binder makes up about 10% w/w to about 50% w/w of the sorbent composition.

Moreover, an important distinction over existing sorbents is that the disclosed DLE sorbents can be in a shaped form. For instance, by extruding, as the data herein demonstrates, the surface area and lithium binding capacity of the sorbents can be increased to a surprising degree. Shaping of the sorbent can be accomplished by using a suitable shaping technique. This technique can be extrusion, pelletizing, granulation, compaction, pressing, marumarizing, or other shaping techniques known to those skilled in the art.

The sorbent compositions may also include where the sorbent composition includes shaped sorbents having a particle size ranging from about 100 to about 4000 microns, optionally about 200 to about 1500 microns, optionally about 20 to about 100 micron or greater. The sorbent compositions may also include where the sorbent compositions include shaped particles having a diameter of 0.5 mm to about 4.0 mm, optionally about 0.65 mm to about 1.75 mm, and a length to diameter ratio of about 0.25:1 to 5:1, optionally about 0.5:1 to 3.5:1. The surface area of these shaped particles can range from about 4 $m^2/g$ to about 105 $m^2/g$, optionally about 45 $m^2/g$ to about 90 $m^2/g$. The sorbent composition may also include where the sorbent composition includes extrudates having an average pore diameter ranging from about 170 to about 230, optionally about 100 to about 170, preferably about 80 nm to about 115 nm.

As discussed further herein, the sorbent compositions may also include where the sorbent compositions are heat treated, optionally where the heat treatment includes heating at about 120° C. to about 450° C. for about 1 hour, optionally about 120° C., 150° C., 180° C., 200° C., 250° C., 300° C., 350° C., 400° C. and/or 450° C. In some aspects, the heat treatment can include heating for up to about 1 hour or greater, optionally about 15 minutes to about 30 minutes, optionally greater than about 2 hours.

The sorbent compositions disclosed herein may also include where the extruded form of the sorbent compositions is spheronized, optionally where the spheronized extruded form of the sorbent compositions are dried at least about 120° C. for at least about one hour or more.

Shaping the sorbent compositions, whether by extrusion, pelletizing, granulation, compaction, pressing, marumarizing, or other shaping techniques known to those skilled in the art, surprisingly led to marked improvements in Lithium adsorption as demonstrated herein. Thus, in some aspects the sorbent compositions are employed in the conventional manner in the form of, for example, spheres or extrudates. Examples of suitable types of extrudates have been disclosed in the literature (see, int al., U.S. Pat. No. 4,028,227). Highly suitable for use are cylindrical particles (which may be hollow or not) as well as symmetrical and asymmetrical polylobed particles (2, 3 or 4 lobes). Additionally, the sorbent may also include where the extruded form of the sorbent composition includes dumbbell shaped extrudates, cylindrical shaped extrudates, spherical shaped extrudates, and/or combinations thereof. In some embodiments, and without being bound by any particular theory or mechanism of action, the benefits of shaping and/or extruding the sorbent compositions can be a result of the combinatorial effects, or synergistic effects, of the shaping/extrusion along with the inclusion of a binder and/or the heat treatment.

In some aspects, the binder for the sorbent compositions may include sodium silicate, optionally where the sodium silicate is at a concentration of about 10% w/w to about 50% w/w, preferably at a concentration of about 20% w/w to about 40% w/w, and more preferably about 23-27%. Moreover, as discussed herein, sodium silicate or other binders may be used solely or in combination with other binders and optionally boehmite, alumina or other alumina hydrates binders or boehmite, alumina or other alumina hydrates/silica binders.

As will be appreciated by one of ordinary skill in the art, the lithium adsorption capacity of the disclosed sorbent composition will vary depending on the conditions under which adsorption is to occur. Nevertheless, as the data in the Examples illustrate, the sorbent compositions may include where the sorbent compositions have a lithium adsorption capacity of about 3 mg/g (mg Li per g of sorbent) to about 7.5 mg/g or greater, preferably about 4.5 mg/g to about 7.5 mg/g and more preferably about 5.5 to about 7.5 mg/g.

Additionally, as discussed in Example RS, under conditions with a nominally 200 mg Li/kg brine at 6000 the disclosed sorbents exhibited a lithium adsorption capacity of about 2 mg/g to about 7 mg/g. As such, when the disclosed sorbents are subjected to other brines it is expected that they would exhibit proportional adsorption ranges based on the concentration and/or activity of lithium in that solution.

IV. Methods of Making Direct Lithium Extraction Sorbent Compositions

Provided herein are methods and processes for producing the disclosed sorbent compositions. Such methods can include, for example, activating a suitable LiDATH precursor such as ATH, boehmite, or alumina with a lithium salt, preferably in an alkaline environment, neutralizing the complex if necessary, combining with a binder including one or more of a peptizable alumina-based binder, or peptizable alumina binder with silica, or colloidal silica, or sodium silicate, followed by shaping such as extrusion or compaction granulation. The activation solution may include LiCl and NaOH or LiOH, or any combination of a lithium salt and alkaline material. The lithium salts may include one or more of lithium hydroxide, lithium carbonate, lithium bicarbonate, lithium sulfate, lithium bromide, lithium nitrate, lithium hexafluoroaluminate, lithium trifluoromethylsulfonate, lithium phosphate, lithium fluoride and others. Alkaline materials may include hydroxides, alkoxides, and/or phosphates of lithium, sodium, potassium, cesium, calcium, and/or ammonium or compounds capable of generating such in the presence of water. Not wishing to be limited to any one theory, for instance, lithium hydride will, in the presence of sufficient water, form lithium hydroxide. After activation the method can further include neutralizing the activated ATH sorbent with a suitable acid such as HCl, HBr, H2SO4, acetic acid, formic acid, phosphoric acid, propionic acid, 2-bromopropionic acid, perchloric acid or aqueous soluble acids or precursors thereof capable of generating a suitable lithium salt. Optionally, the activated sorbent could be subjected to washing steps in order to remove excess caustic material. Optionally the complexed alkaline lithium material may be subjected to anion exchange using soluble salts or immobilized resins capable of exchanging the given anion.

The process may also include peptizing the boehmite or alumina-based binder and/or the boehmite/silica or alumina/silica-based binder with nitric acid. Optionally acids such as hydrochloric acid, formic acid, acetic acid, propionic acid, 2-bromopropanoic acid or other organic acids, hydrobromic acid, hydrofluoric acid, sulfuric acid, phosphoric acid, trifluoromethanesulfonic acid, chromic acid, or others or precursors capable of generating the above, for example but not limited to the use of benzyl bromide to generate a hydrogen bromide or hydrobromic acid in situ. Anhydrous hydrogen halides or hydrogen pseudohalides may similarly be used. The process may also include where activating the aluminum component using the activation solution includes mixing the activation solution with the aluminum component at a ratio of about 1 mole of lithium to 2 moles of aluminum or aluminum hydroxide for aluminum hydroxide or boehmite or 1 mole of lithium to 1 mole of alumina. Optionally the lithium to aluminum ratio may be 1:4 to about 2:1 or greater if inefficient use of lithium is allowable, optionally about 1:2, 1.1:2, 1.3:2, 1.4:2, 1.5:2, 1.7:2, 1.8:2, 1.9:2, 2.0:2, 2.1:2, 2.2:2, 2.3:2, and 2.4:2. For activation of aluminas, the lithium to alumina ratio may be about 0.25:1 to about 2:1, optionally about 1:1, 1.1:1, 1.2:1, 1.3:1, 1.4:1, 1.5:1, 1.6:1, 1.7:1, 1.8:1, 1.9:1, or 2:1. The process may also include where the aluminum component is mixed with the activation solution for about 5 to about 30 minutes, optionally about 30 minutes to 1 hour, optionally for about 1 hour to about 2 hours, optionally for greater than about 2 hours.

Such processes may also include where activating the aluminum component includes contacting the aluminum component with an aqueous solution of lithium chloride and sodium hydroxide to form a sorbent of the formula $(LiOH)_x(LiCl)_{1-x} \cdot 2Al(OH)_3$, where x=0 to 1, followed by reaction with an aqueous solution of hydrochloric acid to convert LiOH in the sorbent to LiCl. Neutralizing the activated aluminum component with HCl includes the addition of HCl to the activation solution until the pH reaches between about 5 to about 7. The process can further include filtering the solution to produce a residue of neutralized lithiated aluminum component, and drying the residue, prior to extruding the residue of aluminum component sorbent to form the sorbent composition in an extruded form. The process may also include milling the dried residue of lithiated aluminum component, optionally milling the dried residue of the lithiated aluminum component to a fine powder, e.g. where the d50 is less than 50 micron, optionally less than 35 micron, optionally less than 25 micron. The process may also include where extruding the aluminum component to form the sorbent composition in an extruded form includes mixing the dried residue of the aluminum component with water to form a paste followed by extrusion through an extruder to form extrudates. The process can further include spheronization of the extrudates of the aluminum component to yield dumbbell shaped extrudates, cylindrical shaped extrudates, spherical shaped extrudates, and/or combinations thereof.

In some aspects, such processes can further include heat treating the sorbent compositions, optionally wherein the heat treatment comprises heating at about 120° C.-450° C., optionally 120° C., 150° C., 180° C., 200° C., 250° C., 300° C., 350° C., 400° C. and/or 450° C. Moreover, in some aspects, the sorbent composition is heat treated for up to about 1 hour or greater, optionally about 15 minutes to about 30 minutes, optionally greater than about 2 hours.

V. Use of Direct Lithium Extraction Sorbent Compositions for Lithium Purification The disclosed DLE sorbents can be used for Lithium adsorption and purification. More particularly, provided herein are processes for producing an aqueous lithium-containing solution from a source of dissolved lithium in solution. The above process is generally used with initial lithium-containing brines containing a dissolved lithium content of preferably at least 100 ppm, but also including 50-100 ppm or less optionally 30-50 ppm. However, there are situations in which one or more optional additional steps may be used pursuant to this invention. A further preferred embodiment of the multi-step process of the invention is wherein said source of dissolved lithium is from a natural or industrial brine that has a lithium concentration of at least about 100 ppm, preferably greater than about 180 ppm and is concentrated with sodium salt. Optionally the brine may be concentrated with one or more of another salt which enhances the recovery of lithium in the sorption operation.

Next, the brine is introduced into a lithium adsorption step. The lithium adsorption step which is in a highly preferred multi-step process of this invention is conducted by passing the lithium containing brine into and out of the sorbent bed—which is preferably placed in a column or other suitable contact vessel until lithium breakthrough in the effluent from the bed. Optionally, continuous stirred reactors, fluidized beds, or other techniques known to those skilled in the art may be used in which to contact the sorbent with the lithium containing brine. Any suitable sorbent can be used however in this novel process, such as described in CN111215040B, CN102631897 B, or U.S. Pat. No. 10,648, 061.

The system is then put through a desorption process step. The lithium desorption step of the preferred multi-step process of this invention is conducted by washing the sorbent with water or other aqueous solutions, preferably a dilute lithium chloride or other lithium salt solution preferably containing 50-300 ppm Li, at a temperature of 40-100° C. or even higher under increased pressure, preferably greater than 50° C., and more preferably greater than 60° C.

A further preferred embodiment of the multi-step process of the invention is wherein said lithium eluent solution comprises at least Ca2+ and/or Mg2+ impurities in solution and in a weight ratio of dissolved Li+:Ca2+ and/or Li+: Mg2+ is enriched by a factor of at least 5, preferably at least 10, and more preferably 100. For example, if a brine has a starting point of 150 Ca:Li, the process will improve the ratio to less than 30:1 and preferably less than 15:1 Ca:Li and more preferably 1.5:1. In another further preferred embodiment the Ca:Li ratio could be further improved from an initial 150:1 to 0.6:1. Through optimization of the embodiment, separate ratios could be achieved during the desorption process. Of the 0.6:1 Ca:Li, for instance, multiple fractions could be obtained at differing purity ratios, for instance: 2.5, 0.6, and 0.03 Ca:Li ratios.

EXAMPLES

The following examples are included to further illustrate various embodiments of the presently disclosed subject matter. However, those of ordinary skill in the art should, in light of the present disclosure, appreciate that many changes can be made in the specific embodiments which are disclosed and still obtain a like or similar result without departing from the spirit and scope of the presently disclosed subject matter.

Figure 2:
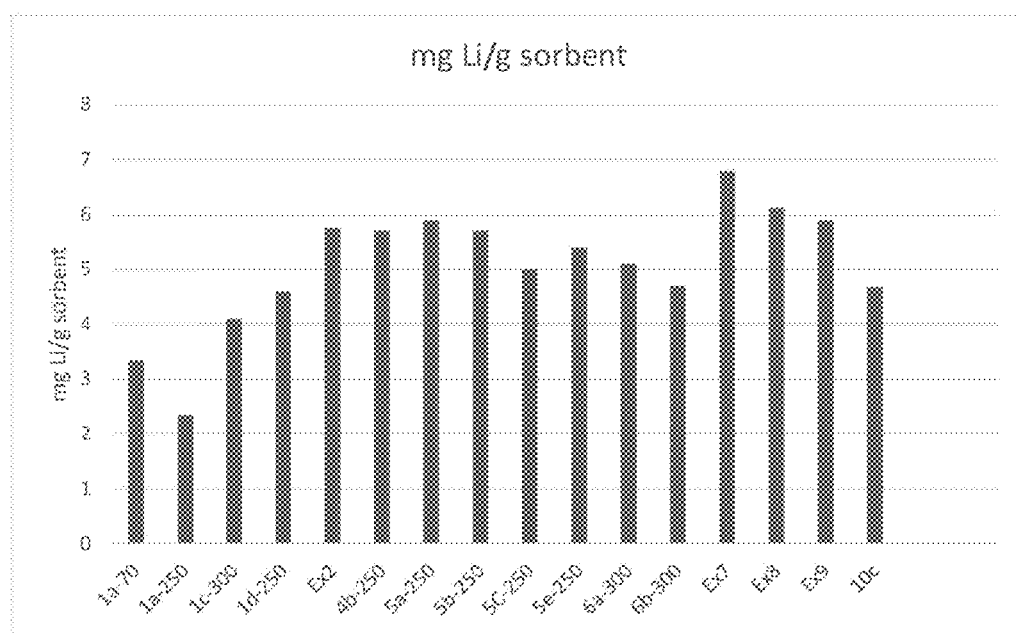
FIG. 2 is a graphical depiction of data from tests of sorbent materials subjected to a screening procedure to determine a relative lithium uptake capacity.

Example RST: Rapid Screen Test:

Prepared sorbent materials were subjected to a screening procedure to determine a relative lithium uptake capacity. A brine containing nominally 200 mg/kg Li and 60000, 30000, and 3000 mg/kg sodium, calcium, and magnesium, respectively, among other minor constituents was used. In general, 1 g of prepared sorbent material was partially unloaded with respect to LiCl by washing three times with a 20 mL of dilute LiCl solution. Then, the partially unloaded sorbent was introduced to a 40 g sample of lithium bearing brine and held at 65° C. A 2 mL aliquot was removed at 6 h and the remaining decanted at 24 h. The sorbent was then washed three times with a 20 ml of dilute LiCl solution to simulate Li desorption. The procedure was repeated for a total of 3 cycles. Li adsorption capacity was determined as the difference in starting and final brine Li concentration multiplied by the solution mass divided by the sorbent mass. Selected results are reported in FIG. 2.

Example 1

Commercially available aluminum hydroxide sample 3 (CA ATH3) was prepared as described in U.S. Ser. No. 10/648,061B2. A portion of the prepared material was saved for subsequent testing (CA ATH3-Ex1a). An additional portion of the sorbent material was then dried and milled to produce a fine powder (Ex1b).

150 g Ex1b was combined with 24 mL water and extruded and dried overnight at 70° C., followed by heat treatment at 150, 180, 200, 250, 300, 350, 400 and 450° C. for 1 h (Ex1c—temp).

60 g IPB1 binder was peptized with 22.8 g of 4.9% HNO3 with 129.7 g additional water. Once the binder was peptized, 113.6 g of the prepared binder material was combined with 128 g Ex1b and subjected to extrusion and heat treatment (Ex1d—temp).

Figure 3A:
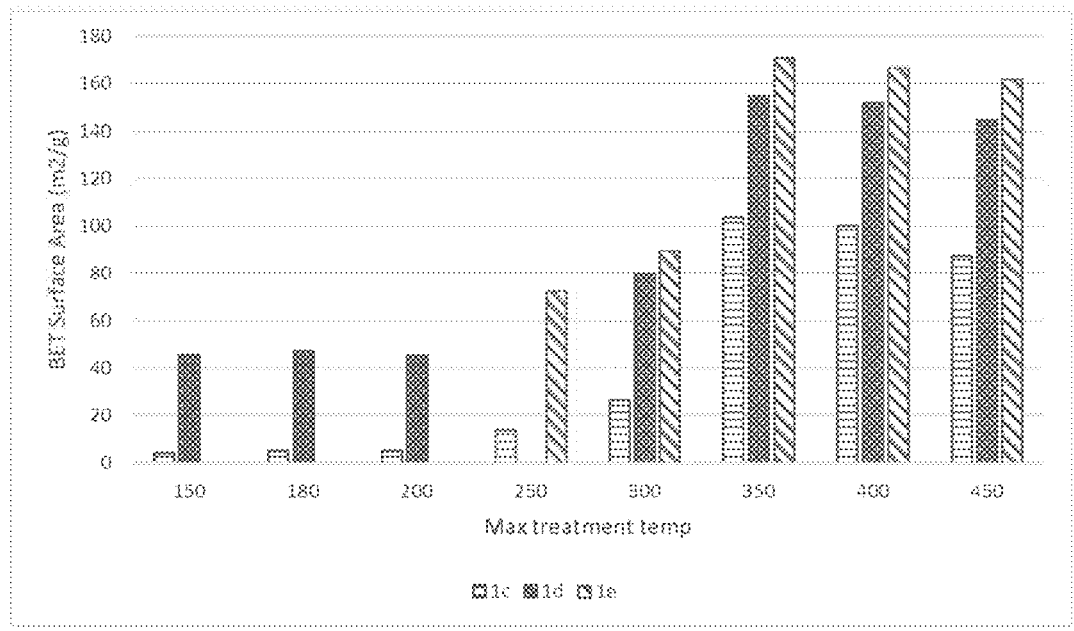
FIGS. 3A and 3B are graphical depictions of data from tests of sorbent materials as disclosed herein, including the effect of treatment temperature on BET surface area (FIG. 3A) and adsorption capacity of mg Li/g sorbent (FIG. 3B) for each of the tested sorbent materials.
Figure 3B:
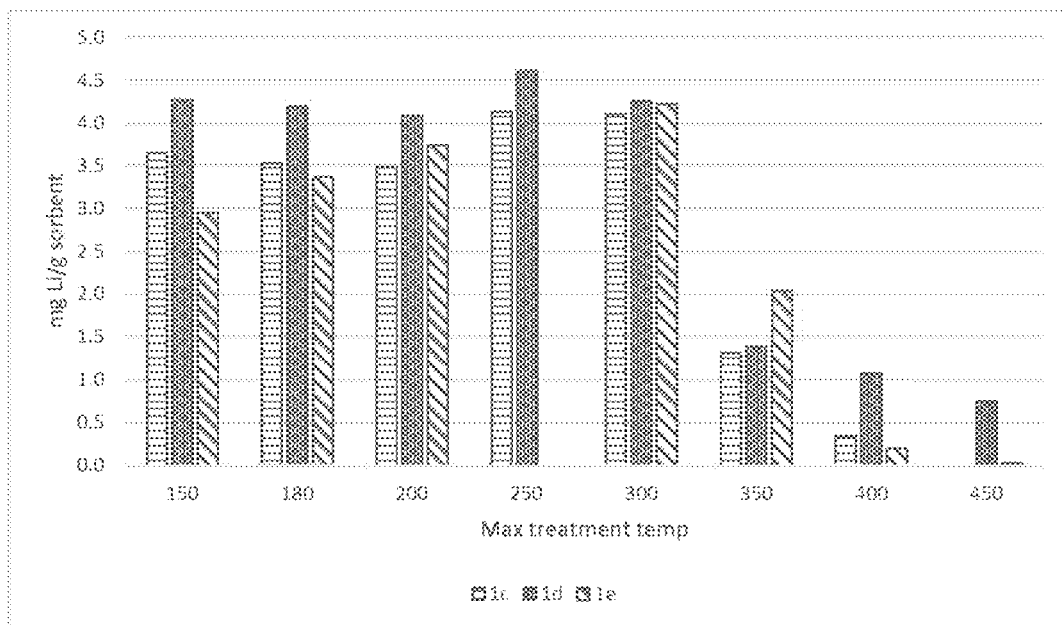

60 g IPB2 binder was peptized with 22.8 g of 4.9% HNO3 with 72.4 g additional water. Once the binder was peptized, 57 g of the prepared binding material was combined with 84 g of Ex 1b with additional 12 mL water and subjected to extrusion and heat treatment. Ex1e—temp Select results are shown in FIGS. 3A and 3B.

Example 2

200 g commercially available aluminum hydroxide 5 (CA ATH5) was treated with 53.8 g LiOH·H$_2$O and held at 70° C. for 92 h. The solution was then neutralized with 186.6 g of 7.7 N HCl at 58° C. After cooling overnight, the pH of the slurry was 6.83 at 18.3° C. The slurry was then filtered and dried at 70° C. for 20 h.

4 g IPB2 was peptized with 1.6 g of 4.9% HNO3 with 5.3 g additional water. Once the binder was peptized, it was then mixed with 16 g dried lithiated CA ATH 5 and 4.5 mL water and extruded through a 1 mm die followed by drying overnight at 120° C. and at 250° C. for 1 h.

Example 3

101.3 g commercially available aluminum hydroxide 1 (CA ATH1) was treated with 367.9 g of an aqueous solution containing 29.57 g LiCl and 44.15 g NaOH. The slurry was held at 70° C. for 2 days. The solution was then neutralized with 48.5 mL 12 M HCl to a pH of 6.5 at 54° C. The slurry was then filtered and dried at 70° C.

30 g dried lithiated CA ATH1 powder was combined with 6 mL water and extruded through a 1 mm die following by drying overnight at 70° C. and at 180 and 250° C. for 1 h. Samples were introduced to the rapid screening test and fragmented.

These results demonstrate that at least in some embodiments a binder is necessary.

Example 4

80 g of commercially available aluminum hydroxide (CA ATH4) 4 was activated with 26.2 g LiCl and 19.6 g NaOH in 281.2 g water at 70° C. for 48 h. The solution was then neutralized with 63.9 g 7.7 N HCl to a pH of 6.33 at 70.8° C. The slurry was filtered and the wetcake was dried at 70° C. for 20 h.

20 g of dried wetcake was mixed with 12 mL H2O to prepare an extrudable paste which was subjected to extrusion through a 1 mm die with subsequent heat treatment. Ex4a.

12.5 g of IPB2 was peptized with 5 g of 4.9% HNO3 with 39 g water. The peptized binder was then mixed with 50 g of dried wetcake and 11.7 g additional water followed by extrusion with a 1 mm die and subsequent heat treatment. Ex4b—temp.

Example 5

Evaluation of an Assortment of Binders

Figure 4A:
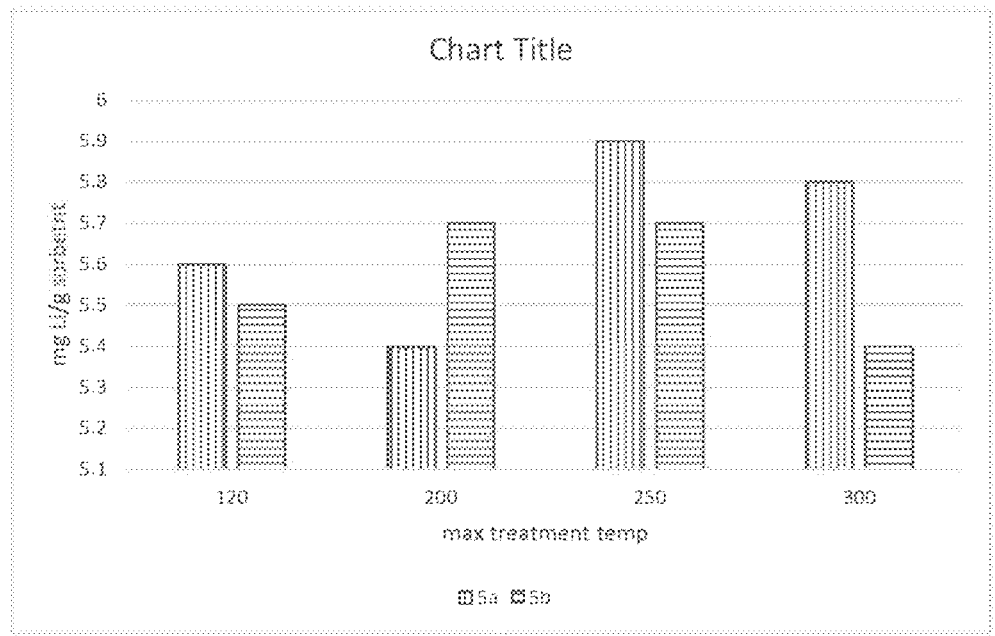
FIGS. 4A and 4B are graphical depictions of data from tests of sorbent materials as disclosed herein, including the effect of treatment temperature on BET surface area (FIG. 4B) and adsorption capacity of mg Li/g sorbent (FIG. 4A) for each of the tested sorbent materials.
Figure 4B:
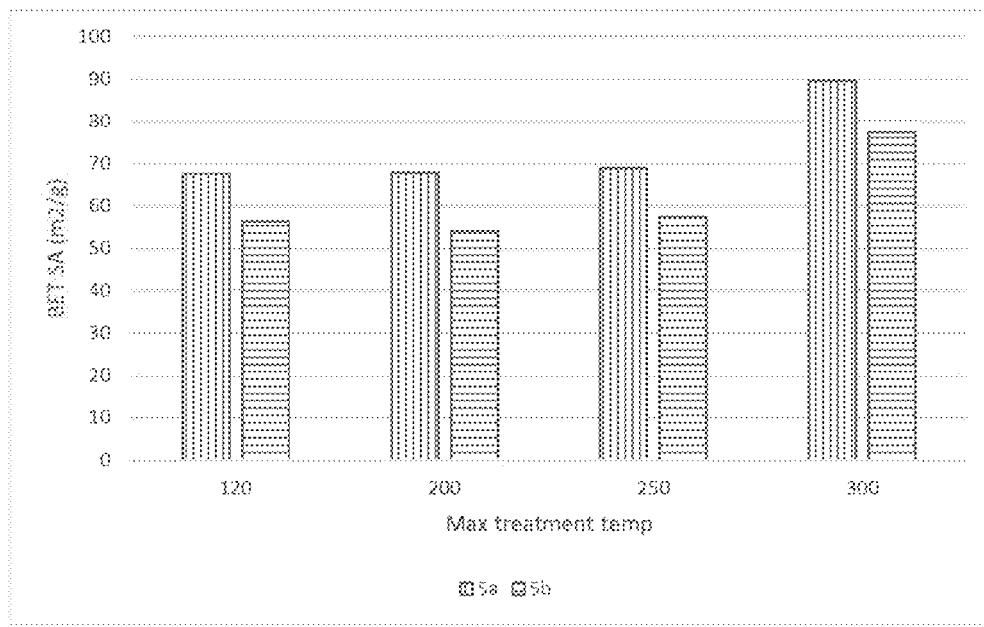

CA ATH4 was activated, neutralized, filtered and dried. The dried powder was then mixed with various binders and subjected to extrusion and heat treatment as shown in FIGS. 4A and 4B. For a given series name, the final heat treatment temperature is indicated after the series name (for example Ex5B-250 was heat treated to 250° C.).

As shown in Table 1:
- a. Ex5a: Binder was prepared by peptizing 4 g IPB1 with 1.6 g 4.9% HNO3 and 5.3 g water.
- b. Ex5b: Binder was prepared by peptizing 12.5 g IPB2 with 5 g 4.9% HNO3 with 39 g water.
- c. Ex5c: Binder was prepared by peptizing 8 g CAB1 with 3.2 g 4.9% HNO3 with 5.6 g water.
- d. Ex5d: Binder was used as received.
- e. Ex5e: Binder was used as received.

TABLE 1

| Series | g CA ATH4 | Binder identity | Binder type | g of binder | g water additional |
|---|---|---|---|---|---|
| Ex6a (10080-36) | 16 | IPB1 | Proprietary boehmite | 4 | 9 |
| Ex6b (10080-45) | 50 | IPB2 | Proprietary boehmite | 12.5 | 11.7 g |
| Ex6c (10080-137) | 16 | CAB1 | Commercially available peptizable alumina hydrate (boehmite) | 4 | 6 mL |
| Ex6d (10080-117) | 20 | CAB2 | Commercially available colloidal silica solution (40%) | 12.5 | 6.7 g |
| Ex6e (10080-116) | 20 | CAB3 | Commercially available Peptized acidic boehmite solution (30%) | 16.7 | — |

Example 6

Alumina Example:

80 g of commercially available alumina CA Al1 was treated with 52.32 g of LiCl, 39.24 g of NaOH, and 562.44 g water at 70° C. for 48 hours. The slurry was then transferred to a flask containing 53 g dilute LiCl solution. 112.8 g 7.7 N HCl was then added with stirring until a pH of 5.62 at 70.2° C. was reached. The material was then filtered and dried at 70° C. for 20 h.

Ex 6a Binder IPB1 (10080-101-1): 26 g of the dried cake was mixed with 6.5 g of IPB1 binder that was previously peptized with 2.6 g of 4.9% HNO3 in 8.6 g H2O. 9.5 mL additional H2O added to form an extrudable paste, and subjected to extrusion followed by heat treatment.

Ex 6b Binder IPB2 (10080-101-2): A separate portion of 26 g was mixed with 6.5 g of IPB2 binder that was previously peptized with 2.6 g of 4.9% HNO3 in 8.6 g H2O. 4.5 mL additional H2O was added to form an extrudable paste, and the material was subjected to extrusion and heat treatment.

Figure 5A:
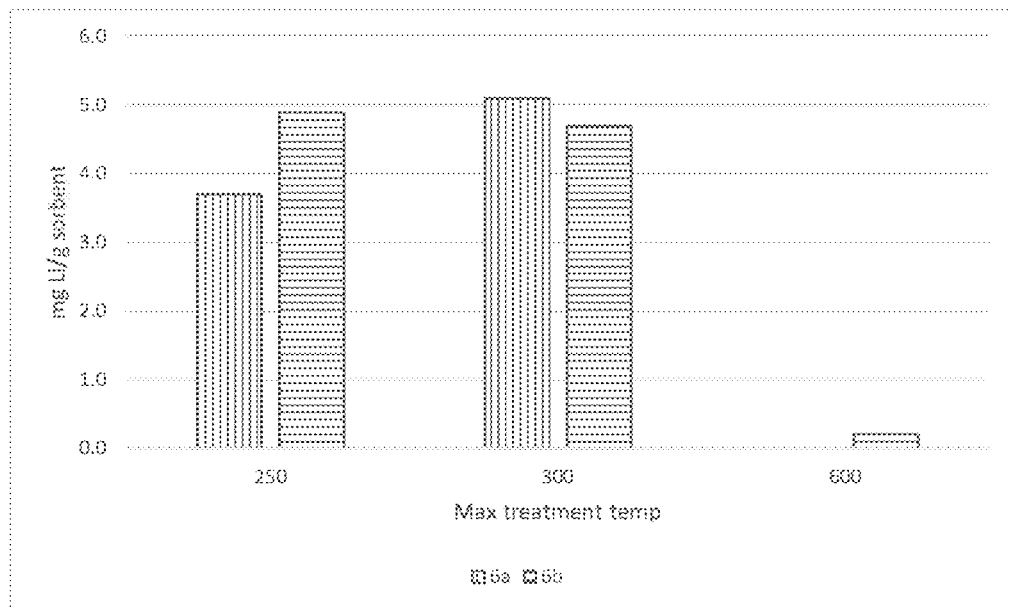
FIGS. 5A and 5B are graphical depictions of data from tests of sorbent materials as disclosed herein, including the effect of treatment temperature on BET surface area (FIG. 5B) and adsorption capacity of mg Li/g sorbent (FIG. 5A) for each of the tested sorbent materials.
Figure 5B:
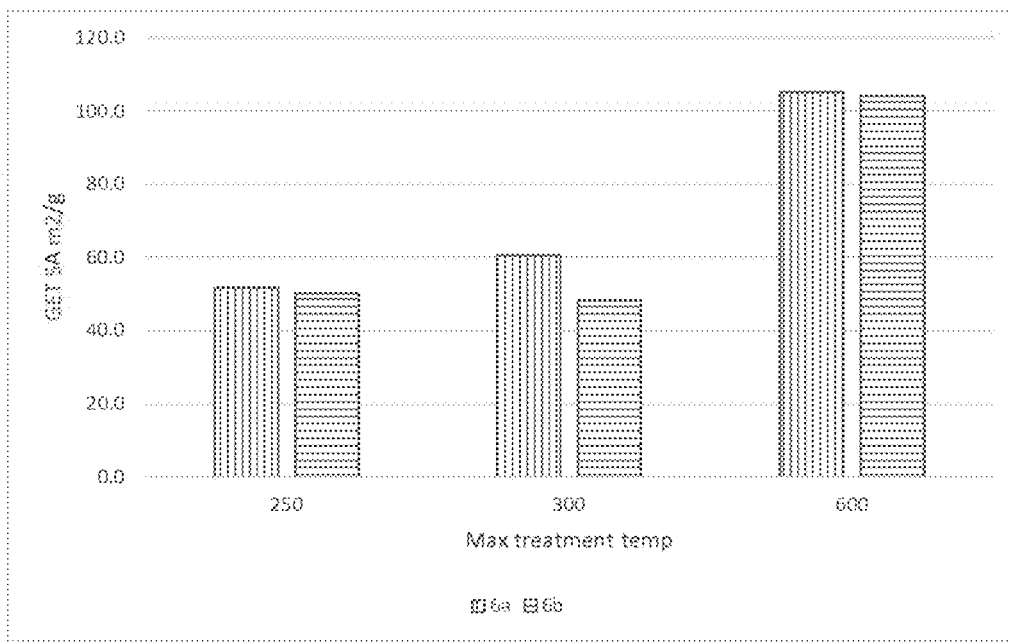

Results are shown in FIGS. 5A and 5B.

Example 7

CA ATH4 was activated, neutralized, filtered and dried. 16 g of the dried powder was then mixed with 5.7 g of AlCl3·6H2O that was previously dissolved in 8.3 g of water. The paste formed was then extruded and subjected to heat treatment at 120° C. for 1 hour followed by 250° C. for 1 hour. The adsorption capacity was measured at 6.8 mg Li/g sorbent. Material treated at only 120° C. disintegrated in the presence of water (10080-73).

Example 8

109.6 g IPB2 was peptized with 1.9 g of 53% HNO3 in 371 g H2O. 503 g lithiated CA ATH4 (preparation described in example 4) was added and extruded through a 2 mm die. The material was dried at 120° C. for 1 hour followed by 250° C. for 1 h. It had a lithium capacity of 6.13 mg Li/g sorbent.

Example 9

91.74 g of bentonite clay was mixed with 511.18 g of lithiated CA-ATH4 (preparation described in example 4) and 296.4 g H2O. The mixture was extruded through a 2 mm die, dried at 120° C. for 1 hour and then heated to 300° C. for 2 hours. It had a lithium capacity of 5.88 mg Li/g sorbent.

Example 10

62.89 g of prepared CA ATH3 (synthesis described in Ex1b) was mixed with 13.7 g IPB2 previously peptized with 0.23 g 53% HNO3 and 42.08 g water. A portion of the material was retained. The remainder of the material was extruded through 1 mm (Ex10a) and 2 mm dies (Ex10b) and subjected to heat treatment.

The retained portion was further mixed with a commercially available derivatized methylcellulose and extruded to 1 mm (Ex 10c) and 2 mm (Ex10d)

Figure 6:
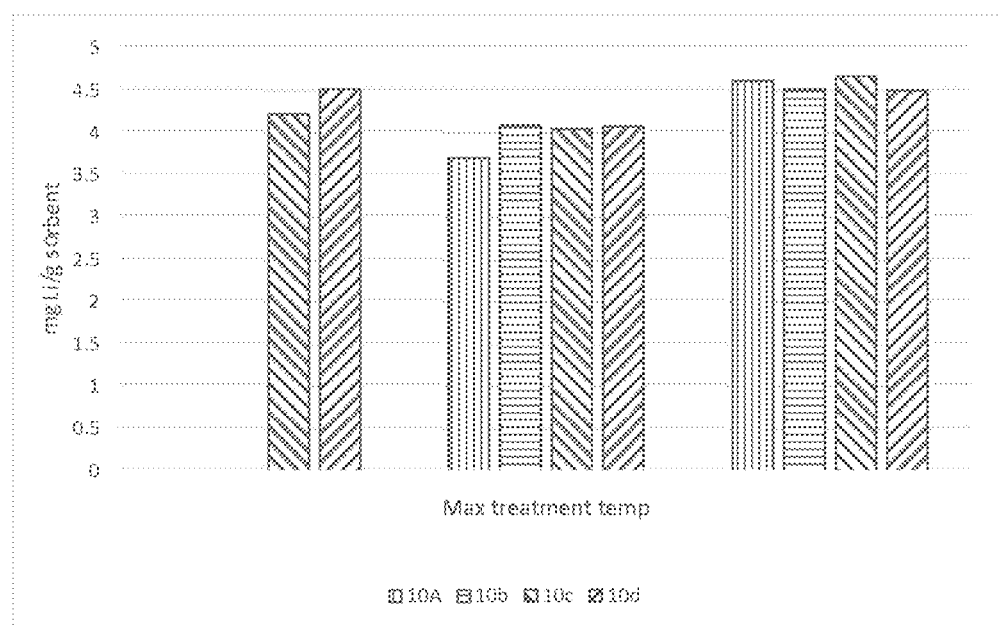
FIG. 6 is a graphical depictions of data from tests of sorbent materials as disclosed herein, including the effect of treatment temperature on adsorption capacity of mg Li/g sorbent for each of the tested sorbent materials.

Results are shown in FIG. 6.

Example Column Flow Test:

To validate the performance of a select sorbent in a model brine adsorption column system: sorbent was loaded into a column with an aspect ratio of 48:1 height:diameter. 15.5 BV of brine containing 160-180 mg Li/kg brine and nominally 30000 mg Ca/kg brine, 3000 mg Mg/kg brine, and 60000 mg Na/kg brine was passed through the column at 62-70 C at a flow rate of 3.4 BV/hour. The brine effluent following the adsorption step was then analyzed for lithium concentration to determine the removal efficiency and loading of the sorbent. CA ATH3-Ex1a sorbent exhibited a loading of 2.47 g Li/kg sorbent with 83% of the lithium value presented to the column being removed by the sorbent. Example 8 sorbent exhibited a loading of 3.85 g Li/kg sorbent with 82% of the lithium value presented to the column being removed by the sorbent. This confirms a higher loading capacity for the sorbent technology described in this invention in comparison with previously described sorbents.

The invention claimed is:

1. A sorbent composition for direct lithium extraction (DLE), the sorbent comprising:
   a lithiated aluminum component, the lithiated aluminum component selected from the group consisting of a lithiated aluminum trihydroxide (ATH), lithiated aluminum oxide and/or lithiated boehmite; and
   an inorganic binder, wherein the lithiated aluminum component makes up about 50% w/w to about 90% w/w of the sorbent composition, wherein the inorganic binder makes up about 10% w/w to about 50% w/w of the sorbent composition, wherein the sorbent composition is in the form of shaped particles, the shaped particles having an average pore diameter of about 80 nm to about 230 nm.

2. The sorbent composition of claim 1, wherein the lithiated aluminum component comprises lithiated ATH (Li-DATH).

3. The sorbent composition of claim 1, wherein the inorganic binder comprises a boehmite-based binder, a boehmite/silica-based binder, a colloidal silica binder, a waterglass binder, an aluminum phosphate binder, an aluminum halide-based binder and/or a combination thereof.

4. The sorbent composition of claim 1, wherein the shaped particles have a particle size ranging from about 100 to about 4000 micron, optionally about 200 to about 1500 micron, optionally about 20 to about 100 micron or greater.

5. The sorbent composition of claim 1, wherein the shaped particles have a diameter of about 0.5 mm to about 4.0 mm, optionally about 0.65 mm to about 1.75 mm, and a length to diameter ratio of about 0.25:1 to 5:1, optionally about 0.5:1 to 3.5:1.

6. The sorbent composition of claim 1, wherein the sorbent composition comprises shaped particles having a Brunauer-Emmett-Teller (BET) surface area ranging from about 4 $m^2/g$ to about 105 $m^2/g$, optionally about 4 $m^2/g$ to about 25 $m^2/g$, optionally about 20 $m^2/g$ to about 45 $m^2/g$, optionally about 45 $m^2/g$ to about 90 $m^2/g$, optionally about 10 $m^2/g$ to about 105 $m^2/g$, optionally about 50 $m^2/g$ to about 90 $m^2/g$, optionally about 70 $m^2/g$ to about 105 $m^2/g$.

7. The sorbent composition of claim 1, wherein the sorbent composition comprises shaped particles having an average pore diameter of about 170 nm to about 230 nm.

8. The sorbent composition of claim 1, wherein the shaped particles are spheronized, wherein the spheronized shaped particles are subsequently dried at about 120° C. or higher.

9. The sorbent composition of claim 1, wherein the sorbent composition is heat treated, wherein the heat treatment comprises heating at about 120° C. to about 450° C.

10. The sorbent composition of claim 1, wherein the sorbent composition is heat treated, wherein the heat treatment comprises heating for up to about 1 hour or greater.

11. The sorbent composition of claim 1, wherein the shaped particles comprise dumbbell shaped particles, cylindrical shaped particles, spherical shaped particles, bilobe shaped particles, trilobe shaped particles, quadrilobed shaped particles and/or combinations thereof, wherein the shaped particles are shaped via extrusion, pelletizing, granulation, compaction, compaction/granulation, and/or pressing.

12. The sorbent composition of claim 1, wherein the binder comprises sodium silicate, wherein the sodium silicate is at a concentration of about 10% w/w to about 50% w/w.

13. The sorbent composition of claim 1, wherein the sorbent composition has a lithium adsorption capacity of about 3.0 mg/g (mg Li per g of sorbent) to about 7.5 mg/g.

14. The sorbent composition of claim 1, wherein the sorbent composition comprises shaped particles having an average pore diameter of about 80 nm to about 170 nm.

15. The sorbent composition of claim 1, wherein the sorbent composition comprises shaped particles having an average pore diameter of about 80 nm to about 115 nm.

* * * * *